US012643477B2

(12) United States Patent
Wieczorek et al.

(10) Patent No.: US 12,643,477 B2
(45) **Date of Patent: \*Jun. 2, 2026**

(54) CAMERA WING SYSTEM, VEHICLE THEREWITH AND METHOD TO OPERATE THE SAME

(71) Applicant: Motherson Innovations Company Limited, London (GB)

(72) Inventors: Romeo Wieczorek, Stuttgart (DE); Matthias Koller, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/989,527

(22) Filed: Dec. 20, 2024

(65) Prior Publication Data

US 2025/0121775 A1 Apr. 17, 2025

Related U.S. Application Data

(63) Continuation of application No. 17/983,584, filed on Nov. 9, 2022, now Pat. No. 12,208,743.

(30) Foreign Application Priority Data

Dec. 2, 2021 (DE) .......................... 102021131823.8

(51) Int. Cl.
*B60R 1/28* (2022.01)
*B60R 11/04* (2006.01)
(Continued)

(52) U.S. Cl.
CPC ................ *B60R 1/28* (2022.01); *B60R 11/04* (2013.01); *G06T 7/50* (2017.01); *G06T 7/73* (2017.01);
(Continued)

(58) Field of Classification Search
None
See application file for complete search history.

(56) References Cited

U.S. PATENT DOCUMENTS

| | | | |
|---|---|---|---|
| 9,126,525 B2 | 9/2015 | Lynam et al. | |
| 2017/0341583 A1 | 11/2017 | Zhang | |
| 2019/0217888 A1 | 7/2019 | Perry | |

FOREIGN PATENT DOCUMENTS

DE 102015218033 A1 3/2017

OTHER PUBLICATIONS

German Patent and Trademark Office, Office Action for 10 2021 131 823.8, dated Aug. 2, 2022.

*Primary Examiner* — Samira Monshi
(74) *Attorney, Agent, or Firm* — Jones Day

(57) ABSTRACT

A camera-wing-system for a vehicle comprising at least one camera for recording a field of view (FOV) in a scene at least around a rear part of the vehicle, wherein a presented view is provided to a driver of the vehicle as a part of the field of view, the camera-wing-system is adapted to update an image section from the presented view of the at least one camera to another presented view different from the previous presented view to keep a point of interest of the rear part of the vehicle, preferably a trailer as the rear part of the vehicle, within the presented view provided to the driver regardless of a driving situation of the vehicle, and the image section is updated basis on a distance between the at least one camera and a geometric calculation of a triangle between a center of rotation, a salient point, and the at least one camera of the vehicle.

17 Claims, 9 Drawing Sheets

(51) Int. Cl.

| | |
|---|---|
| *G06T 7/50* | (2017.01) |
| *G06T 7/73* | (2017.01) |
| *G06V 10/46* | (2022.01) |
| *G06V 20/56* | (2022.01) |
| *H04N 7/18* | (2006.01) |
| *H04N 23/695* | (2023.01) |
| *B60R 11/00* | (2006.01) |
| *G01S 17/86* | (2020.01) |

(52) U.S. Cl.
CPC ............ *G06V 10/462* (2022.01); *G06V 20/56* (2022.01); *H04N 7/183* (2013.01); *H04N 23/695* (2023.01); *B60R 2011/0085* (2013.01); *G01S 17/86* (2020.01); *G06T 2207/30252* (2013.01)

104

CAMERA WING SYSTEM, VEHICLE THEREWITH AND METHOD TO OPERATE THE SAME

CROSS-REFERENCE TO RELATED APPLICATION

This application is a continuation of U.S. patent application Ser. No. 17/983,584, filed on Nov. 9, 2022, which claims priority to German Application No. DE 10 2021 131 823.8, filed on Dec. 2, 2021, each of which are incorporated herein by reference.

FIELD OF THE INVENTION

The present disclosure relates to tracking systems and more particularly to a time of flight (ToF) based tracking system to determine a trailer angle for updating an image section in a side view camera.

BACKGROUND OF THE INVENTION

The statements in this section merely provide background information related to the present disclosure and may not constitute prior art.

Current trailer tracking systems have difficulty identifying a rear end of a trailer system. As such, the current tracking systems are incapable of accurately track and monitor the end of the trailer in order to update the field of view to ensure the end of the trailer is always in view of the tracking system. It is the object of this disclosure to effectively track and monitor the rear end of the trailer or vehicle and accordingly update an image section and overcomes at least some of the stated problems above.

SUMMARY OF THE INVENTION

It is an object of the invention to provide a camera-wing-system for a vehicle solving at least some of the disadvantages of the prior art, especially a system to update image section of the vehicle based on change in angle of the trailer/vehicle.

The problem is solved by a camera-wing-system for the vehicle comprising at least one camera for recording a field of view, FOV, in a scene at least around a rear part of the vehicle, wherein a presented view is provided to a driver of the vehicle as a part of the FOV, the camera-wing-system is adapted to update an image section from the presented view of the at least one camera to another presented view different from the previous presented view to keep a point of interest of the rear part of the vehicle, preferably a trailer as the rear part of the vehicle, within the presented view provided to the driver regardless of a driving situation of the vehicle, and the image section is updated basis on a distance between the at least one camera and a geometric calculation of a triangle between a center of rotation, a salient point, and the at least one camera of the vehicle.

The term "camera-wing-system" denotes the component arranged at the side of the vehicle at a position suitable to record at least the rear view from the vehicle. The position of the camera-wing-system might be the same as for conventional vehicle mirror systems. Due to the possibility to display the recorded scenery inside the vehicle on a display, the camera-wing-system might be arranged at a position outside the field of view of the driver of the vehicle. The wing system comprises an arm or wing on which the camera is installed so that the camera is positioned over the wing somewhat away from the chassis of the vehicle so that the chassis of the vehicle cannot restrict the field of view of the camera, or can only partially restrict the field of view of the camera.

The term "vehicle" denotes any motor driven vehicle driven be a driver, where the driver requires information about persons, other vehicles or objects in the near surrounding of the vehicle to be able to drive safety. As an example, motor vehicles are cars or trucks, especially when pulling trailers. The term "driving situation" denotes the direction, in which the vehicle is currently driven. The common driving situation is driving straight ahead, while cornering is a different driving situation. Other driving situations include reversing, parking, or turning. The latter can be a special form of cornering. Depending on the driving situation, the requirements for the illumination system change due to changing sceneries of interest to be observed by the driver via the camera-wing-system.

The term "camera" denotes any device capable of recording or recognizing the environment of a vehicle and of displaying this recognized or recorded environment in an image so that a driver can process the environment as driving information based on the image display. The camera might be an infrared (IR) camera. IR cameras will increase the visibility of objects during nighttime. Especially CCD or CMOS cameras can detect near infrared (NIR) wavelengths not detectable be the human eye. The NIR denotes light with wavelengths within a spectral range between 700 nm and 1400 nm. NIR can rely on the sun's invisible infrared (IR) radiation during daytime operation. During nighttime operation, the NIR light may be provided by IR light sources of the illumination system illuminating the scenery in the field of view, where the reflected light is recorded by the camera. To be able to be used during nighttime, the camera must be sensitive at least to a part of the spectrum of the light emitted by the light sources of the illuminating system.

The term "field of view" denotes the extent of the observable world that is "seen" (recorded) at any given moment by the camera. The field of view relates to an angular field of view specified in degrees in vertical and horizontal direction. The recorded field of view can be displayed to the driver by camera-wing-system on a corresponding display connected to the camera-wing-system. In some embodiment the display might be part of the camera-wing-system. The field of view is directed to the areas of interest for the driver to be able to drive the vehicle safety without endangering other persons, objects, or vehicles in the field of view, or damaging the own vehicle. The areas of interest might by the rear and side views of the vehicle, preferably on both sides of the vehicle as well as front views.

The term "scenery" denotes the observable world, which can be seen by the driver when using the camera-wing-system. The scenery might be only a part of the observable world in the field of view. In daytime operation, the overall brightness might be enough to observe the complete observable world in the field of view of the camera. In nighttime operation the scenery might be restricted to the parts of the observable world, which are illuminated by the illumination system. Objects not being illuminated might be not recorded by the camera due to the too low level of light being reflected from these "dark" objects.

In an embodiment the camera-wing-system further comprises a ToF sensor adapted to measure said distance, wherein ToF sensor is configured outside a housing that accommodates the at least one camera of the camera-wing-system.

In an embodiment the camera-wing-system having the at least one camera and the ToF sensor is configured within said housing of the camera-wing-system. In an embodiment the camera-wing-system having the at least one camera is adapted to capture the FOV as well as measure said distance.

In yet embodiment the camera-wing-system having the salient point of the trailer is the point of interest which is a detected prominent part of the vehicle.

In yet embodiment the camera-wing-system having the point of interest is a detected prominent part of the vehicle.

In yet embodiment the camera-wing-system having the detected distinctive part of the vehicle is at least one of a marking and a unique feature attached to the vehicle.

In yet embodiment the camera-wing-system having the unique feature includes at least one of sticker, a side light, and a rear-most axle of the vehicle.

In yet embodiment the camera-wing-system having the salient point is detected by a suitable optical recognition software installed and executed on an electronic control unit of the camera-wing-system.

In yet embodiment the camera-wing-system having the system requires initialization after a straight-ahead situation.

In yet embodiment the camera-wing-system having the system requires initialization after a restart or after attaching a new trailer.

In yet embodiment the camera-wing-system having the system starts initialization only when detecting a straight-ahead situation based on a speed data and a steering angle of the vehicle in a timeframe.

In yet embodiment the camera-wing-system having the information pertaining to any change in the ignition state is recorded, and in such an event re-initialization is performed to measure the distance to salient points.

In yet embodiment the camera-wing-system having the system detects the straight-ahead situation in an event distance between the first camera to at least one salient point located on that side and distance between the second camera to at least one salient point located on that side is at a predefined distance calibrated for straight ahead situation.

The invention further relates to a vehicle comprising at least one camera-wing-system as claimed in the present invention.

The invention further relates to a method to operate a camera-wing-system mounted on a vehicle comprising at least one camera, comprising following steps: recording a field of view by at least one camera in a scene at least around a rear part of the vehicle, wherein providing a presented view to a driver of the vehicle as a part of the field of view, adapting the camera-wing-system to update an image section from the presented view of the at least one camera to another presented view different from the previous presented view to keep a point of interest of the rear part of the vehicle, preferably a trailer as the rear part of the vehicle, within the presented view provided to the driver regardless of a driving situation of the vehicle, and updating the image section is performed basis on a distance between the at least one camera and a geometric calculation of a triangle between a center of rotation, a salient point, and the at least one camera of the vehicle.

The invention further relates to a method to operate a tracking system comprising the method of operate a camera-wing-system as described above. Details of the tracking system and its operation is described e.g. with respect to FIG. 2.

It should be noted that the features set out individually in the following description can be combined with each other in any technically advantageous manner and set out other forms of the present disclosure. The description further characterizes and specifies the present disclosure in particular in connection with the Figures.

BRIEF DESCRIPTION OF THE DRAWINGS

In order that the disclosure may be well understood, there will now be described various forms thereof, given by way of example, reference being made to the accompanying drawings, in which.

Figure 1A:
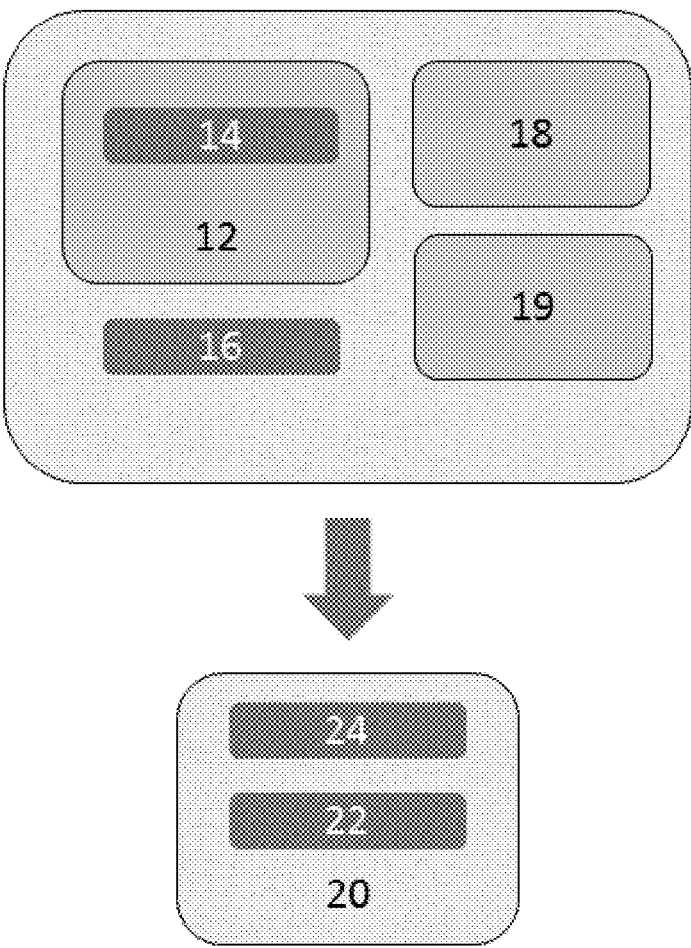
FIG. 1a: depicts a schematic view of a trailer and camera-wing-system.

The drawings referred to in this description are not to be understood as being drawn to scale except if specifically noted, and such drawings are only exemplary in nature.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIGS. 1a, 1b, 1c and 1d depict schematic views of a camera-wing-system 12 of a trailer 20 or vehicle 20. As illustrated in FIG. 1a, the camera-wing-system 12 comprised of at least one camera 14 configured within a housing of the camera-wing-system 12 and a time-of-flight (TOF) sensor 16 located outside or attached to said housing. The at least one camera 14 is configured to capture a field-of-view (FOV) while the TOF sensor 16 is configured to measure distance between the at least one camera 14 and a salient point (as depicted in FIG. 5 including other figures).

Figure 1B:
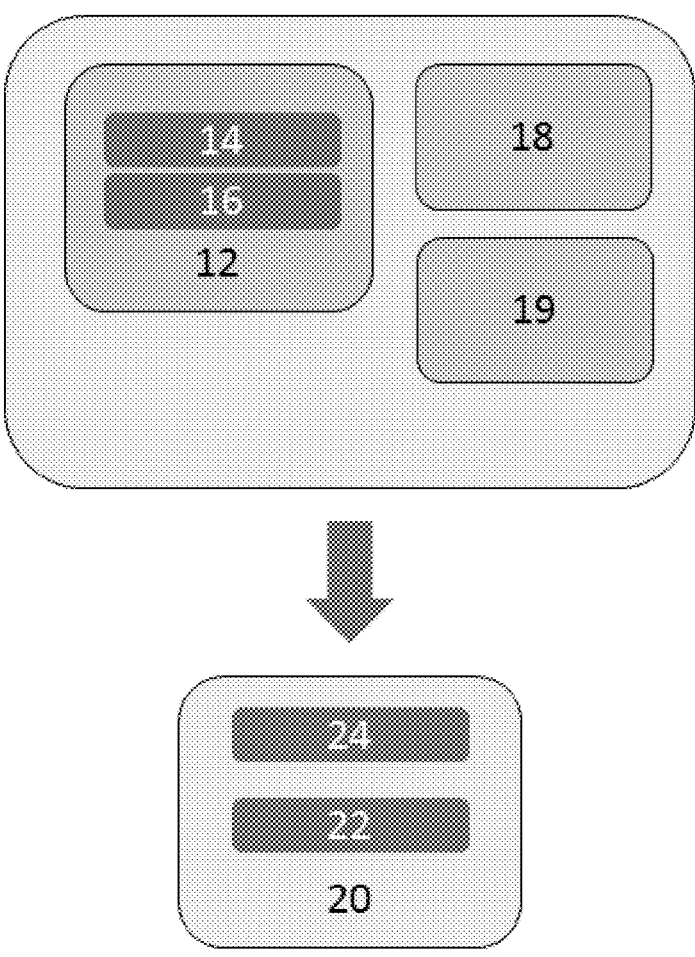
FIG. 1b: depicts another schematic view of the trailer and camera-wing-system.

In another embodiment, as illustrated in FIG. 1b, the camera-wing-system 12 comprises the least one camera 14 and the ToF sensor 16, wherein the least one camera 14 and the ToF sensor 16 are configured within said housing of the camera-wing-system 12. The at least one camera 14 is configured to capture a field-of-view (FOV) while the TOF sensor 16 is configured to measure distance between the at least one camera 14 and a salient point (as depicted in FIG. 5 including other figures).

Figure 1C:
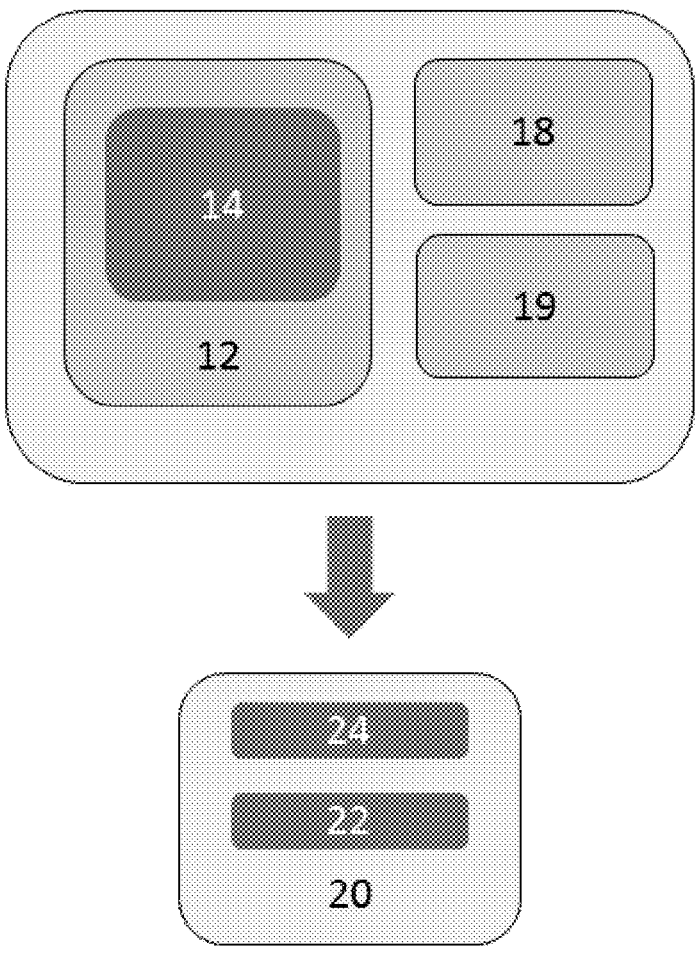
FIG. 1c: depicts yet another schematic view of the trailer and camera-wing-system.

In yet another embodiment, as illustrated in FIG. 1c, the camera-wing-system 12 comprises the at least one camera 14 is configured to capture a field-of-view (FOV). Further, the at least one camera 14 is designed such that it is adapted to measure distance between the at least one camera 14 and a salient point (as depicted in FIG. 5 including other figures). The at least one camera 14 is configured within the housing of the camera-wing-system 12. In an embodiment, the light sensor of the at least one camera 14 may have a specification ranging from 0.1 megapixel to 100 megapixels.

Figure 1D:
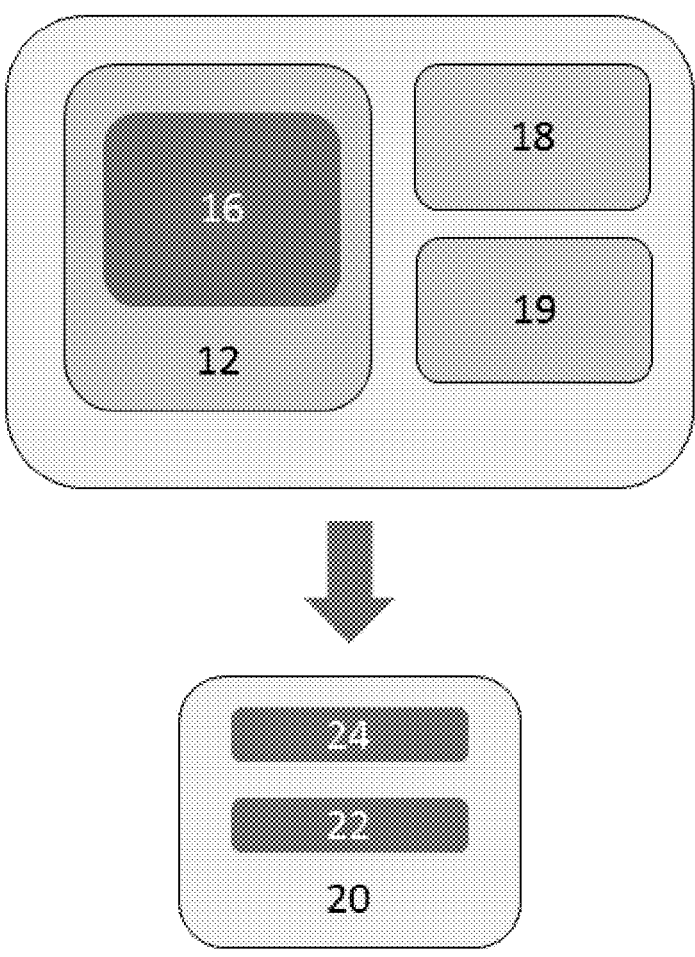
FIG. 1d: depicts yet another schematic view of the trailer and camera-wing-system.
Figure 5:
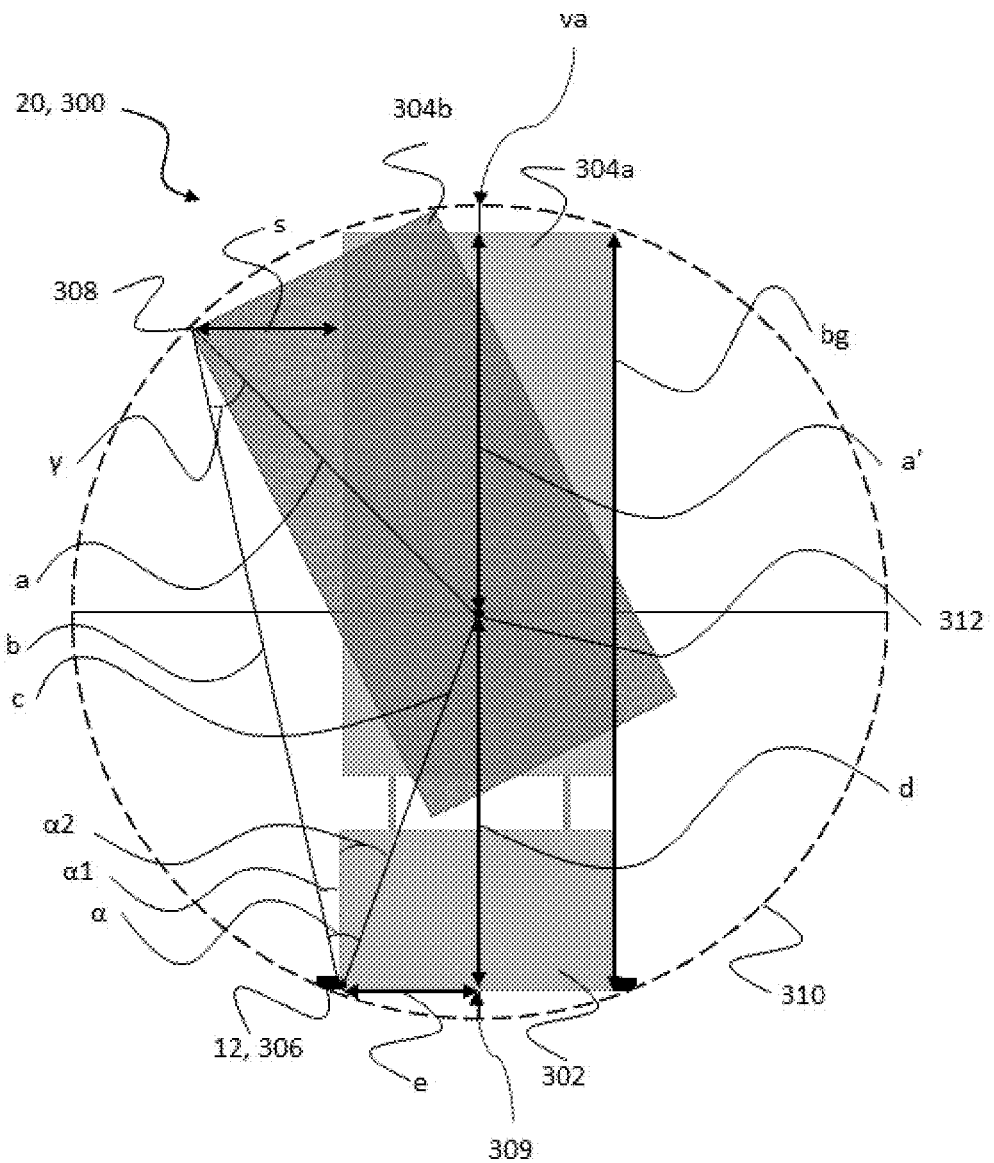
FIG. 5: depicts a diagram for determining the adjustment angle for an image capturing device for a semi-trailer.

In yet another embodiment, as illustrated in FIG. 1d, the camera-wing-system 12 comprises the TOF sensor 16 to measure distance between the at least one camera 14 and a salient point (as depicted in FIG. 5 including other figures). Further, the TOF sensor 16 is adapted to capture a field-of-view (FOV). The TOF sensor 16 may have more pixels to cater to the need of capturing light signals thrown by itself as well as external light signal similar to an image sensor. In an embodiment, the light sensor of the at TOF sensor 16 may have a specification ranging from 5 pixels to 0.5 megapixel.

The camera-wing-system 12 further comprises an electronic control unit (ECU) 18 and an image section 19. In a scenario wherein only camera 14 is a part of the camera-wing-system 12, the camera 14 is adapted to work as a regular image sensor to capture the FOV as well as measure distance similar to a TOF sensor 16. In similar way, a scenario, wherein only TOF sensor 16 is a part of the camera-wing-system 12, the TOF sensor 16 is configured with more pixels such that it is adapted to work as a regular image sensor to capture the FOV as well as measure distance similar to a TOF sensor 16.

The salient point 24 of the trailer is the point of interest which is a detected prominent part of the vehicle 20. The point of interest is a detected prominent part of the vehicle 20. The detected distinctive part of the vehicle 20 is at least one of a marking and a unique feature attached to the vehicle 20. Further, the unique feature includes at least one of sticker, a side light, and a rear-most axle of the vehicle 20. The salient point 24 is detected by a suitable optical recognition software installed and executed on the ECU 18 of the camera-wing-system 12. The system 12 requires initialization after a straight-ahead situation. The system 12 requires initialization after a restart or after attaching a new trailer. The camera-wing-system 12 according to any one of the preceding claims, wherein the system 12 starts initialization only when detecting a straight-ahead situation based on a speed data and a steering angle of the vehicle 20 in a timeframe. The straight-ahead situation described hereinabove refer to a situation wherein the cabin and the trailer are inline.

The camera-wing-system 12 according to claim 12, wherein the information pertaining to any change in the ignition state is recorded, and in such an event re-initialization is performed to measure the distance to salient points.

The camera-wing-system 12 according to any one of the preceding claims, wherein the system 12 detects the straight-ahead situation in an event distance between the first camera 12 to at least one salient point 24 located on that side and distance between the second camera 12 to at least one salient point 24 located on that side is at a predefined distance calibrated for straight ahead situation In yet another embodiment, the camera-wing-system 12 for a vehicle 20 comprising at least one camera 14 for recording a field of view in a scene at least around a rear part of the vehicle 20. A presented view is provided to a driver of the vehicle 20 as a part of the field of view, the camera-wing-system 12 is adapted to update an image section 19 from the presented view of the at least one camera 14 to another presented view different from the previous presented view to keep a point of interest of the rear part of the vehicle 20, preferably a trailer 300, 400 as the rear part of the vehicle

20, within the presented view provided to the driver 60 regardless of a driving situation of the vehicle 20. The image section 19 is updated basis on a distance between the at least one camera 14 and a geometric calculation of a triangle between a center of rotation 312, a salient point 24, and the at least one camera 14 of the vehicle 20.

Figure 3:
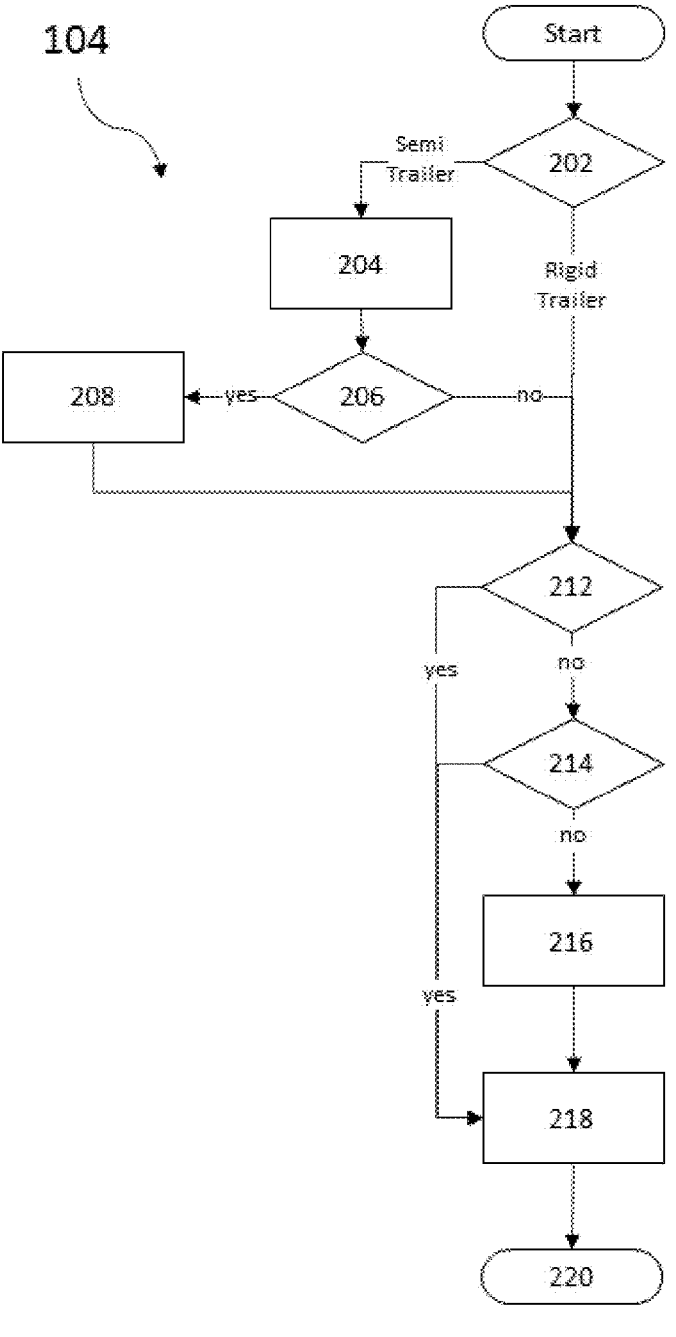
FIG. 3: depicts a sub-process for determining the salient point of the trailer and the distance from the salient point to an image capturing device.
Figure 6:
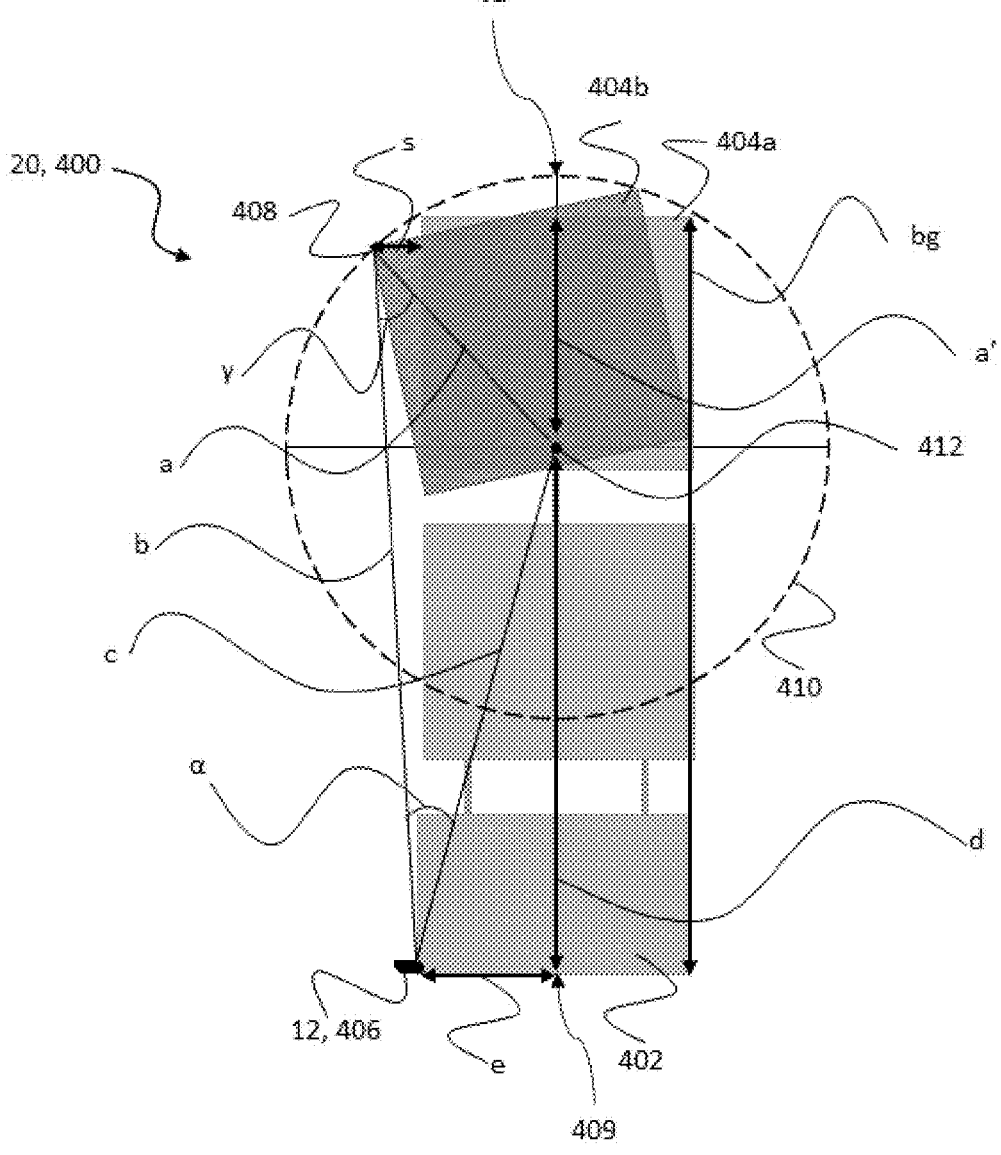
FIG. 6: depicts a diagram for determining the adjustment angle for an image capturing device for a rigid trailer.

The trailer 20 may either be a semi-trailer 300 or a rigid trailer 400, as seen in FIG. 5 and FIG. 6 respectively. The trailer 20 is comprised of a marking point 22 and a salient point 24. The marking point 22 is located along a leading edge 305 of the semi-trailer 300, as seen in FIG. 3. The salient point 24 may include but not limited to one or combination of the marking point 22, the rear wheel on the trailer 20, a sticker placed near the rear end of the trailer 20, and a side light located near the rear of the trailer 20.

The camera-wing-system 12 or a ToF array without MEMs technology can be used as a solid state sensor to detect the trailer 20 for the semi-trailer 300 or the rigid-trailer 400 location to update the image section 19. By having a multitude of pixels, the at least one camera 14 is able to recognize the trailer 20 according to distinctive points via a software performing an algorithm as described in this foregoing disclosure. The angle of the trailer 20 can be determined based on the distance from the at least one camera 14 or ToF sensor 16 to the salient point 24. The salient point 24 may be one or combination of the rear wheel on the trailer 20, a sticker placed near the rear of the trailer 20, or a side light located near the rear of the trailer 20. The angle of the trailer 20 may also be determined based on the distance from the at least one camera 14 or ToF sensor 16 to the marking point 22 located along a front edge of the trailer 20.

Active lighting may be used so that the camera-wing-system 12 is able to recognize the trailer 20 in dark places with minimum to no external lighting, or at night. Additionally, the camera-wing-system 12 is able to scan for blind spots, the rear view, objects and their distance, and approach speeds. The measurement of the distance to the salient point 24 is calculated, at least once, at an angle of approximately zero degrees before the angle of the trailer 20 is determined. When the trailer 20 has an angular offset of approximately ten degrees or greater the salient point 24 is sufficiently visible and can be recognized to measure the distance. Measurements when the angular offset is less than ten degrees can be performed if the salient point 24 can be sufficiently recognized.

The camera-wing-system 12 is also able to perform a double measurement to the salient point 24 and the marking point 22 on the semi-trailer 300 to ascertain the angle. By performing the measurement from both sides simultaneously the distance of the salient point 24 and the marking point 22 can be compared to determine the angle. This enables the camera-wing-system 12 to precisely determine when the trailer 20 is straight and the length of the vehicle or the distance to the salient point 24.

Figure 2:
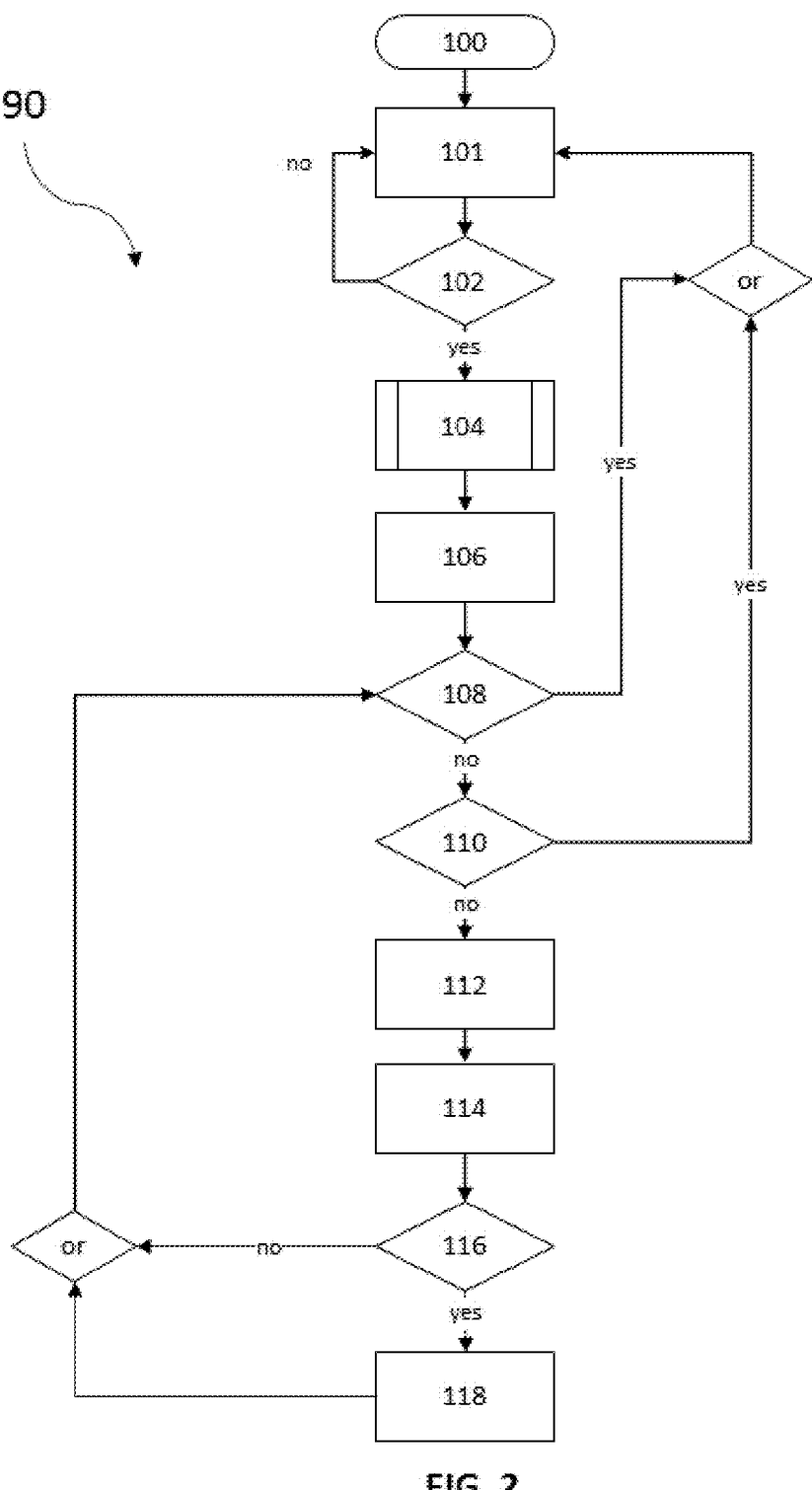
FIG. 2: depicts a method for time of flight trailer tracking to update an image section.

FIG. 2 depicts a method 90 for time of flight (ToF) trailer tracking to update an image section. The method 90 uses a method 100 to operate a camera-wing-system 12 for the trailer 20 to update the image section 19, as seen in FIGS. 1a, 1b, and 1c. The method 100 comprises following steps: recording a field of view by at least one camera 14 in a scene at least around a rear part of the vehicle 20; providing a presented view to a driver of the vehicle 20 as a part of the field of view; adapting the camera-wing-system 12 to update an image section 19 from the presented view of the at least one camera 14 to another presented view different from the previous presented view to keep a point of interest of the rear part of the vehicle 20, preferably a trailer 300,400 as the rear part of the vehicle 20, within the presented view provided to the driver 60 regardless of a driving situation of the vehicle 20; and updating the image section is performed basis on a distance between the at least one camera 14 and a geometric calculation of a triangle between a center of rotation 312, a salient point 24, and the at least one camera 14 of the vehicle 20.

Figure 4A:
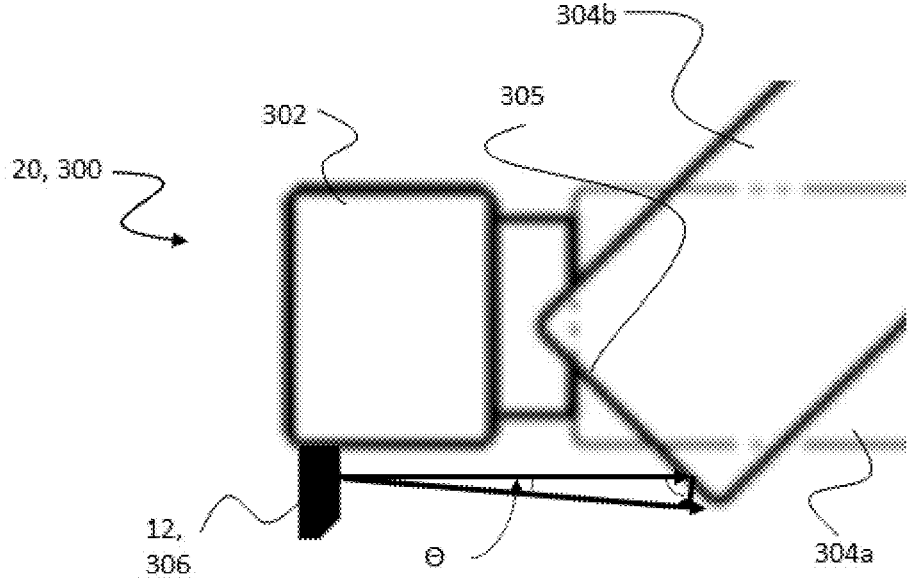
FIG. 4a: depicts a diagram for determining the adjustment angle for an image capturing device for a semi-trailer using the front of the semi-trailer.
Figure 4B:
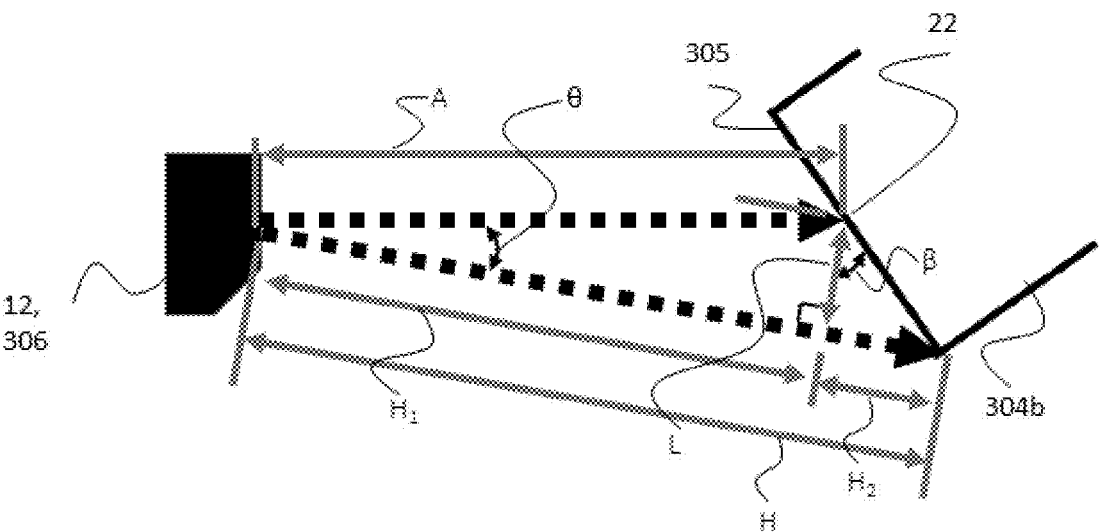
FIG. 4b: depicts an enlarged view of the diagram for determining the adjustment angle for an image capturing device for a semi-trailer using the front of the semi-trailer.

In a step 101 of the method 90 the steering angle and speed are measured. In a step 102 if the steering angle is greater than five degrees or if the speed is zero the camera-wing-system 12 reverts back to the step 101 to measure the steering angle and speed. If the steering angle is less than five degrees and the speed is greater than zero for five seconds the camera-wing-system 12 proceeds to a sub-process step 104. The sub-process 104 is used to determine the salient point 24, and will be further discussed in FIG. 3. In a step 106, the distance from the step 104 is logged into the memory within the EDU 18. Then in a step 108, the camera-wing-system 12 checks to see if the ignition is off. In an event the ignition is off, the camera-wing-system 12 reverts back to step 101 to measure the steering angle and speed. Alternatively, if the ignition is on, the camera-wing-system 12 proceeds to a step 110. In the step 110, the camera-wing-system 12 checks to see if the trailer 20 signal is interrupted. If the trailer 20 signal is interrupted, the camera-wing-system 12 reverts back to step 101 to measure the steering angle and speed. If the trailer 20 signal is not interrupted, the camera-wing-system 12 proceeds to a step 112 where the distance to the salient point 24 is measured. Once the distance is measured a trailer angle α is calculated in a step 114. Further, as indicated in FIG. 4b, helix angle β can be calculated for a specific type of trailer/vehicle. Here are two different methods of angle determination in 114. The described method is the determination of the angle α. However, the determination of the angle β can also be used. To choose between α and β, it can be an OR or an AND/OR operation. The method to determine β has the advantage that it is closer and therefore has advantages in bad weather conditions, but it is not possible with all vehicle types, except for semitrailers. Also, the two methods to determine α or β can also check each other.

In a step 116 if the trailer angle α is less than ten degrees, the camera-wing-system 12 reverts back to step 101 to measure the steering angle and speed. If the trailer angle α is greater than ten degrees, the camera-wing-system 12 progresses to a step 118. In the step 118, the camera-wing-system 12 updates the image section 19 accordingly to ensure the salient point 24 is visible within the image section 19.

FIG. 3 depicts the sub-process 104 to determine the salient 24 as seen in FIG. 5 and FIG. 6. In a step 202, the camera-wing-system 12 determines if the vehicle is the semi-trailer 300 or the rigid-trailer 400. If the vehicle is the semi-trailer 300 the camera-wing-system 12 progresses to step 204 where the camera-wing-system 12 determines the marking point 22 of the semi-trailer 300. Once the marking point 22 is determined, the camera-wing-system 12 determines if a leading edge 305, as seen in FIG. 4a, can be detected on the semi-trailer 300 in a step 206. If the leading edge 305 is detected a helix angle β is calculated in step 208. Once the helix angle β is calculated or if the leading edge 305 is not detected in step 206, the camera-wing-system 12 progresses to step 212. In step 212, the camera-wing-system 12 determines if there is a sticker located at the salient point 24. The sticker is optimized to reflect the wavelength of the camera-wing-system 12 illumination, with the preferred wavelength being in the near infrared range NIR. The stickers reflect the infrared light emitted by the camera-wing-system 12. If there is a sticker the camera-wing-system 12 progresses to a step 218 where the distance from the at least one camera 14 to the salient point 24. The distance is then sent to initialization in a step 220. If a sticker is not detected in step 212, the camera-wing-system 12 checks for a side light at the salient point 24 in step 214. If there is a side light the camera-wing-system 12 progresses to a step 218 where the distance from the at least one camera 14 to the salient point 24. The distance is then sent to initialization in a step 220. If the side light is not detected, the camera-wing-system 12 detects the wheels rearmost axel at the salient point 24 in step 216. The Camera-wing-system 12 then progresses to a step 218 where the distance from the at least one camera 14 to the salient point 24. The distance is then sent to initialization in a step 220.

If the vehicle is a rigid-trailer system 400 the ToF tracking system progresses to step 212. In step 212 the camera-wing-system 12 determines if there is a sticker located at the salient point 24. If there is a sticker the camera-wing-system 12 progresses to a step 218 where the distance from the at least one camera 14 to the salient point 24. The distance is then sent to initialization in a step 220. If a sticker is not detected in step 212, the camera-wing-system 12 checks for a side light at the salient point 24 in step 214. If there is a side light, the camera-wing-system 12 progresses to a step 218 where the distance from the at least one camera 14 to the salient point 24. The distance is then sent to initialization in a step 220. If the side light is not detected, the camera-wing-system 12 detects the wheels rearmost axel at the salient point 24 in step 216. The camera-wing-system 12 then progresses to a step 218 where the distance from the at least one camera 14 to the salient point 24. The distance is then sent to initialization in a step 220.

FIG. 4a depicts a diagram for determining an adjustment angle β (helix angle) for the at least one camera 14 for the semi-trailer 300 using the front edge 305 of the semi-trailer 300. A semi-trailer cab 302 supports the at least one camera 14. In this form the at least one camera 14 is seen on only one side of the semi-trailer cab 302, but it may be located on either side or both sides of the semi-trailer cab 302. The semi-trailer 300 is able to be positioned into a first position 304a or a second position 304b. The semi-trailer 300 is in a first position 304a when a trailer angle θ is at an angle of less than five degrees. When the semi-trailer 300 is in a first position 304a the image capturing device 306 is unable to detect the leading edge 305. When a semi-trailer is in the second position 304b, the trailer angle θ is at an angle greater than five degrees and the at least one camera 14 is able to detect a leading edge 305.

FIG. 4b depicts an enlarged view of the diagram for determining the adjustment angle β for an at least one camera 14 for a semi-trailer 300 using the leading edge 305 of the semi-trailer 300. The at least one camera 14, and the camera-wing-system 12 imbedded therein, measures a first distance A. The first distance A corresponds to the distance from the at least one camera 14 to the marking point 22 along the leading edge 305 of the semi-trailer 300 in the second position 304b. A distance H is then measured from the at least one camera 14 to a second point along the leading edge 305 of the semi-trailer 300 in the second position 304b. The second point along the leading edge 305 is preferably the point at the edge of the semi-trailer 300. The at least one camera 14 is able to differentiate the pixels of when the leading edge 305 of the trailer 20 ends and uses that point to determine the distance H. The at least one camera 14 determines an angle θ using the marking point 22. A distance H₁ is then calculated using equation H₁=A cos θ. The distance H₁ corresponds to the distance from the at least one camera 14 to a point wherein a distance L perpendicularly intersects the distance H. The distance L extend from the marking point 22 to the distance H. A distance H₂ extends from where the distance L perpendicularly intersects the distance H to the second point along the leading edge 305. The distance H₂ is calculated using the equation H₂=H–H₁. The distance L is determined using L=A sin θ. The helix angle β is then determined using the equation β=tan⁻¹ H₂/L.

FIG. 5 depicts a diagram for determining the trailer angle α for the at least one camera 14 for the semi-trailer 300 using the salient point 24. The ToF camera 12 is coupled to the semi-trailer cab 302. A distance bg measures the distance from the image capturing device 12 to the rearmost end of the semi-trailer 300 in the first position 304*a*. The distance bg is a known value.

The semi-trailer 300 includes a center of rotation 312. The semi-trailer 300 pivots around the center of rotation 312 and the salient point 24 follows the theoretical curve of a circle of rotation 310. The center of rotation 312 is located at a vertical distance d along the central vehicle axis va to the central front end 309 of the semi-trailer 300 and a horizontal distance e (perpendicular to distance d) between the at least one camera 14 and the central front end 309. The vertical distance d and the horizontal distance e are known values. A distance a' is the distance from the center of rotation 312 to the rearmost end of the semi-trailer 300 and is determined using the equation a'=bg–d. The distance a' and the horizontal distance e are used in the following equation a=$\sqrt{a'^2+e^2}$ to determine a distance a. The distance a measures from the center of rotation 312 to the salient point 24 located on the semi-trailer 300 in the second position 304*b*. A distance c is the distance from the at least one camera 14 to the center of rotation 312. The distance c can be determined using the equation c=$\sqrt{d^2+e^2}$. A distance b is the distance from the At least one camera 14 to the salient point 24, and is a measured value from the At least one camera 14. An angle γ is between distance b and distance a. The angle γ is determined using equation $$\gamma = \cos^{-1}\frac{(bg-d)^2 + b^2 - (d^2 + e^2)}{2cb},$$

The trailer angle α is the angle between the distance b and the distance c and can be determined using equation $$\propto = \cos^{-1}\frac{c^2 + b^2 - a^2}{2cb}.$$

An angle α₂ measures the angle between distance c and the edge of the semi-trailer cab 302 and can be determined using equation $$\propto_2 = 90° - \tan^{-1}\frac{d}{e}.$$

An angle α₁ is the measurement between distance b and the edge of the semi-trailer cab 302. The angle α₁ is determined using equation ∝₁=∝–∝₂. The angle α₁ is the adjustment angle for the at least one camera 14. The distance s denotes the distance by which the trailer 300 is deflected perpendicular to the central vehicle axis va in the second position 304*b* from the track of the trailer 300 in comparison to the first position 304*a*

FIG. 6 depicts a diagram for determining the trailer angle α for the at least one camera 14 for the rigid-trailer 400 using the salient point 24. The rigid-trailer 400 is comprised of the rigid-trailer cab 402 that supports the at least one camera 14. The rigid-trailer 400 is able to be positioned in a first position 404*a* or a second position 404*b*. A distance bg measures the distance from the image capturing device 12 to the rearmost end of the rigid-trailer 400 in the first position 404*a*. The distance bg is a known value. The rigid-trailer 400 includes a center of rotation 412. The rigid-trailer 400 pivots around the center of rotation 412 and the salient point 24 follows the theoretical curve of a circle of rotation 410. The center of rotation 412 is located at a vertical distance d along the central vehicle axis va to the central front end 409 of the rigid-trailer 400 and a horizontal distance e between the at least one camera 14 and the central front end 409. The vertical distance d and the horizontal distance e are known values. A distance a' is the distance from the center of rotation 412 to the rearmost end of the rigid-trailer 400 and is determined using the equation a'=bg–d. The distance a' and the horizontal distance e are used in the following equation a=$\sqrt{a'^2+e^2}$ to determine a distance a. The distance a measures from the center of rotation 412 to the salient point 24 located on the rigid-trailer 400 in the second position 404*b*. A distance c is the distance from the At least one camera 14 to the center of rotation 412. The distance c can be determined using the equation c=$\sqrt{d^2+e^2}$. A distance b is the distance from the At least one camera 14 to the salient point 24, and is a measured value from the At least one camera 14. An angle γ is between distance b and distance c. The angle γ is determined using equation $$\gamma = \cos^{-1}\frac{(bg-d)^2 + b^2 - (d^2 + e^2)}{2cb}.$$

The trailer angle α is the angle between the distance b and the distance c and can be determined using equation $$\propto = \cos^{-1}\frac{c^2 + b^2 - a^2}{2cb}.$$

An angle α₂ measures the angle between distance c and the edge of the rigid-trailer cab 402 and can be determined using equation $$\propto_2 = 90° - \tan^{-1}\frac{d}{e}.$$

An angle α₁ is the measurement between distance b and the edge of the semi-trailer cab 302. The angle α₁ is determined using equation ∝₁=∝–∝₂. The angle α₁ is the adjustment angle for the At least one camera 14. The distance s denotes the distance by which the trailer 400 is deflected perpendicular to the central vehicle axis va in the second position 404*b* from the track of the trailer 400 in comparison to first position 404*a*.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. The features of the invention disclosed in the foregoing description, in the drawings and in the claims can be essential both individually and in any combination for the implementation of the invention in its various embodiments.

LIST OF REFERENCE NUMERALS

10—vehicle
12—Camera-wing-system
14—at least one camera
16—Time Of Flight (TOF) Sensor
18—Electronic Control Unit (ECU)
19—Image Section
20—Trailer/Semi-trailer/Vehicle
22—Marking Point
24—Salient Point
90—Tracking System Method
100—Method to operate a camera-wing-system
101—Steering Angle and Speed Measurement
102—Steering Angle and Speed Determination
104—Sub-Process
106—Distance Logged into Memory
108—Check to see if Ignition is on
110—Check to see if Trailer Signal is Interrupted
112—Distance to Salient Point is Measured
114—Trailer Angle Calculated
116—Trailer Angle Comparison
118—Image Section Updated
202—Trailer Type Determination
204—Determine Marking Point of Semi-Trailer
206—Determine if there is a Leading Edge
208—Helix Angle Calculated
212—Determine if there is a Sticker
214—Determine if there is a Side Light
216—Detect Wheel Axel
218—Distance to Salient Point Measured
220—Initialization
300—Semi-Trailer
302—Semi-Trailer Cab
304a—Semi-Trailer in a First Position
304b—Semi-Trailer in a Second Position
305—Leading Edge
306—Image Capturing Device
308—Salient Point
309—Central Front End of the Semi-Trailer
310—Semi-Trailer Circle of Rotation
312—Semi-Trailer Center of Rotation
400—Rigid-Trailer
402—Rigid-Trailer Cab
404a—Rigid-Trailer in a First Position
404b—Rigid-Trailer in a Second Position
406—Image Capturing Device
408—Salient Point
409—Central Front End of the Rigid-Trailer
410—Rigid-Trailer Circle of Rotation
412—Rigid-Trailer Center of Rotation
α—Trailer angle between distance b and distance c $\alpha_1$—Angle between distance b and the edge of the Semi-Trailer Cab
$\alpha_2$—Angle between distance c and the edge of the Semi-Trailer Cab
β—Adjustment angle or helix angel resulting from $$\beta = \tan^{-1}\frac{H_2}{L}.$$

γ—Trailer angle between distance b and distance a
θ—Trailer angle
a'—Distance from Center of Rotation to the rearmost end of the Semi-Trailer/Rigid-Trailer
a—Distance from Center of Rotation to the Salient Point located on the Semi-Trailer/Rigid-Trailer in the second position
b—Distance from the at least one camera to the Salient Point
c—distance from the at least one camera to the Center of Rotation
d—Distance between Center of Rotation and Central Front End of the Semi-Trailer/Rigid-Trailer
e—Distance between the at least one camera and Central Front End
s
bg—Distance from the Image Capturing Device to the rearmost end of the Semi-Trailer/Rigid-Trailer in the first position
va—Central Vehicle Axis
A—First distance
L—distance perpendicularly intersecting distance H, where distance L extends from the marking point 22 to the distance H resulting from L=A sin θ
H—distance from camera 14 to a second point along the leading edge 305 of the semi-trailer 300 in the second position
$H_1$—calculated distance, where $H_1$=A cos θ
$H_2$—calculated distance, where equation $H_2$=H–$H_1$.

The invention claimed is:

1. A camera-wing-system for a vehicle, comprising
at least one camera for recording a field of view (FOV) in a scene at least around a rear part of the vehicle, wherein
a presented view is provided to a driver of the vehicle as a part of the field of view,
the camera-wing-system is adapted to update an image section from the presented view of the at least one camera to another presented view different from the previous presented view to keep a point of interest of the rear part of the vehicle within the presented view provided to the driver regardless of a driving situation of the vehicle, and
the image section is updated based on a distance between the at least one camera and a geometric calculation of a triangle between a center of rotation, a salient point, and the at least one camera of the vehicle.

2. The camera-wing-system for a vehicle according to claim 1, further comprises a time of flight (ToF) sensor adapted to measure said distance, wherein the ToF sensor is configured outside a housing that accommodates the at least one camera of the camera-wing-system.

3. The camera-wing-system for a vehicle according to claim 1, wherein the at least one camera and the ToF sensor are configured within said housing of the camera-wing-system.

4. The camera-wing-system for a vehicle according to claim 1, wherein the at least one camera is adapted to capture the FOV as well as measure said distance.

5. The camera-wing-system for a vehicle according to claim 1, wherein a salient point of a trailer is the point of interest which is a detected prominent part of the vehicle.

6. The camera-wing-system according to claim 1, wherein the point of interest is a detected prominent part of the vehicle.

7. The camera-wing-system according to claim 6, wherein the detected prominent part of the vehicle is at least one of a marking and a unique feature attached to the vehicle.

8. The camera-wing-system according to claim 7, wherein the unique feature includes at least one of a sticker, a side light, and a rear-most axle of the vehicle.

9. The camera-wing-system according to claim 1, wherein the salient point is detected by a suitable optical recognition software installed and executed on a control unit of the camera-wing-system.

10. The camera-wing-system according to claim 1, wherein the system requires initialization after a straight-ahead situation.

11. The camera-wing-system according to claim 1, wherein the system requires initialization after a restart or after attaching a new trailer.

12. The camera-wing-system according to claim 1, wherein the system starts initialization only when detecting a straight-ahead situation based on a speed data and a steering angle of the vehicle in a timeframe.

13. The camera-wing-system according to claim 12, wherein information pertaining to any change in the ignition state is recorded, and in such an event re-initialization is performed to measure the distance to salient points.

14. The camera-wing-system according to claim 1, wherein the system detects a straight-ahead situation in an event distance between a first camera to at least one salient point located on a first side of the vehicle and distance between a second camera to at least one salient point located on a second side of the vehicle is at a predefined distance calibrated for the straight ahead situation.

15. A vehicle comprising the camera-wing-system of claim 1.

16. A method of operating a camera-wing-system mounted on a vehicle, comprising:

recording a field of view (FOV) by at least one camera in a scene at least around a rear part of the vehicle;

providing a presented view to a driver of the vehicle as a part of the FOV; and adapting the camera-wing-system to update an image section from the presented view of the at least one camera to another presented view different from the previous presented view to keep a point of interest of the rear part of the vehicle within the presented view provided to the driver regardless of a driving situation of the vehicle, wherein updating the image section is performed based on a distance between the at least one camera and a geometric calculation of a triangle between a center of rotation, a salient point, and the at least one camera of the vehicle.

17. A method to operate a tracking system comprising the method of claim 16.

*    *    *    *    *